United States Patent

Potanin et al.

(10) Patent No.: US 6,805,950 B2
(45) Date of Patent: Oct. 19, 2004

(54) MAGNETIC RECORDING MEDIUM HAVING A LOW MOLECULAR WEIGHT AZO DYE INCLUDING AN ARYL GROUP

(75) Inventors: Andrei Potanin, Woodbury, MN (US); Stanley C. Busman, North St. Paul, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/328,498

(22) Filed: Dec. 23, 2002

(65) Prior Publication Data

US 2004/0121186 A1 Jun. 24, 2004

(51) Int. Cl.[7] .............................................. G11B 5/712
(52) U.S. Cl. ...................... 428/323; 428/329; 428/403; 428/694 BN; 428/694 BB; 428/694 BS
(58) Field of Search .................. 428/323, 329, 428/403, 694 BU, 694 BB, 694 BS

(56) References Cited

U.S. PATENT DOCUMENTS

| | | | |
|---|---|---|---|
| 4,113,903 A | | 9/1978 | Choinski |
| 4,543,382 A | * | 9/1985 | Tsuchida et al. ............ 524/267 |
| 5,176,955 A | | 1/1993 | Ejiri et al. |
| 5,318,838 A | | 6/1994 | Matsufuji et al. |
| 5,354,610 A | | 10/1994 | Ozawa et al. |
| 5,501,903 A | | 3/1996 | Erkkila et al. |
| 5,759,666 A | | 6/1998 | Carlson et al. |
| 5,827,600 A | | 10/1998 | Ejiri et al. |
| 6,099,895 A | | 8/2000 | Mayo et al. |
| 6,139,946 A | | 10/2000 | Bailey et al. |
| 6,245,476 B1 | | 6/2001 | Kodama et al. |
| 6,653,000 B2 | * | 11/2003 | Jinbo et al. ............. 428/694 B |
| 2002/0064687 A1 | | 5/2002 | Jimbo et al. |

FOREIGN PATENT DOCUMENTS

JP  61-261817  * 11/1986

* cited by examiner

*Primary Examiner*—Stevan A. Resan
(74) *Attorney, Agent, or Firm*—Eric D. Levinson

(57) ABSTRACT

A single layer or dual layer magnetic recording medium comprising a non-magnetic substrate having a front side and a back side, a back coat formed on the back side. In a single layer medium, the magnetic layer comprises a ferromagnetic powder dispersed in a binder, and a surface modifier comprising a low molecular weight azo dye. In the dual layer embodiment, a lower support layer is formed over the front side comprising a granular alpha iron oxide compound dispersed in a binder, and as a surface treatment agent, at least one low molecular azo dye having the following general formula:

—Ar—N=N—Ar— wherein Ar represents an aryl group, each of which independently comprises at least one pendant group selected from an electron donor, and an electron acceptor, and a magnetic layer is formed over the lower layer.

10 Claims, No Drawings

MAGNETIC RECORDING MEDIUM HAVING A LOW MOLECULAR WEIGHT AZO DYE INCLUDING AN ARYL GROUP

FIELD OF THE INVENTION

The present invention relates to magnetic recording media such as magnetic tapes, and more specifically to surface treatment agents useful with metal oxide and ferromagnetic pigments in magnetic recording media.

BACKGROUND OF THE INVENTION

Magnetic recording media are widely used in audio tapes, video tapes, computer tapes, disks and the like. Magnetic media may use thin metal layers as the recording layers, or may comprise particulate magnetic compounds as the recording layer. The latter type of recording media employs particulate materials such as ferromagnetic iron oxides, chromium oxides, ferromagnetic alloy powders and the like dispersed in binders and coated on a substrate. In general terms, magnetic recording media generally comprise a magnetic layer coated onto at least one side of a non-magnetic substrate (e.g., a film for magnetic recording tape applications).

In certain designs, the magnetic coating (or "front coating") is formed as a single layer directly onto a non-magnetic substrate. In an effort to reduce the thickness of this magnetic recording layer, an alternative approach has been developed to form the front coating as a dual layer construction, including a support layer (or "lower layer") on the substrate and a reduced-thickness magnetic layer (or "upper layer") formed directly on the support or lower layer. With this construction, the lower layer is typically non-magnetic or substantially non-magnetic, generally comprised of a non-magnetic powder and a binder. Conversely, the upper layer comprises a magnetic metal particle powder or pigment dispersed in a polymeric binder.

Finally, with magnetic recording tapes, a backside coating is typically applied to the opposing side of the non-magnetic substrate in order to improve the durability, conductivity, and tracking characteristics of the media.

The single layer of magnetic recording media, and both layers of dual layer magnetic recording media generally include a granular pigment. Popular pigments are metal oxides, ferromagnetic metal oxides, and ferromagnetic metal alloys; the material in the lower layer of the dual layer media is generally non-magnetic, and that in the upper layer is magnetic but similar pigment compounds may be used in both layers. Surface treatment agents are commonly used in magnetic media manufacturing to improve dispersion quality of particulate materials in both the magnetic recording layer and in the nonmagnetic lower layer. Typically the surface treatment agents are mixed with the pigment in a solvent, and then the surface treated pigments are combined with the other ingredients in a separate mixing step.

To be useful, a surface treatment agent must promote binder adsorption to the treated pigment surfaces. Different pigments have different surface properties, so different agents are required for different pigments. The agents vary depending on such factors as the basic or acidic properties of the pigment surface. Organic acids are the most commonly used surface treatment agent for magnetic materials with metal particles, as the metal particles often have a strongly basic surface. Recording media often utilize alpha hematite ($\alpha$-$Fe_2O_3$) particles in the formulations; dual layer recording media may utilize such particles in the nonmagnetic lower layer formulations, along with carbon black particles. The magnetic layer of such recording media often utilize gamma hematite ($\gamma$-$Fe_2O_3$) or ferromagnetic metal or metal alloy powders, along with carbon black particles.

All front coatings or layers of magnetic recording media generally include a binder composition. The binder composition performs such functions as dispersing the particulate materials, increasing adhesion between layers and to the substrate, improving gloss and the like. As might be expected, the formulation specifics associated with the requisite upper layer, lower layer, and back coat, as well as coating of the same to an appropriate substrate are highly complex, and vary from manufacturer to manufacturer; however, most binders include such materials as thermoplastic resins.

It has now been discovered that using certain low molecular weight, carboxylic acid containing azo dyes as surface treatment agents in one or more iron oxide or ferromagnetic powder-containing layers of a magnetic recording medium improves dispersion and modifies the rheology of the layer formulations, improving the gloss and the coating ability thereof

SUMMARY OF THE INVENTION

One aspect of the present invention relates to a magnetic recording medium including a non-magnetic substrate, a back coat, a lower support layer, and a magnetic upper layer. The substrate defines a front side and back side, with the back coat being formed on the back side. The lower layer is disposed over the front side of the substrate and includes a primary pigment material and a conductive carbon black material and a surface treatment agent for the primary pigment material dispersed in a binder.

Another aspect of the invention provides a surface treatment agent useful for iron oxide-containing non-magnetic lower layer of a dual layer magnetic recording medium. Specifically, the invention provides a surface treatment for $\alpha$-$Fe_2O_3$ containing lower layers comprising a low molecular weight azo dye having a formula:

wherein Ar represents an aryl group, each of which comprises at least one pendant group selected from an electron donor, and an electron acceptor.

Additionally, the invention provides a dual layer magnetic recording medium comprising a recording layer, and a nonmagnetic lower layer wherein the lower layer comprises a multiplicity of $Fe_2O_3$ particles, and as a surface treatment therefore, a low molecular weight azo-dye comprising the general formula:

wherein Ar represents an aryl group, each of which comprises at least one pendant group selected from an electron donor, and an electron acceptor.

Another aspect of the invention provides a single layer magnetic recording medium comprising a non-magnetic substrate having a front side and a back side, a back coat formed on the back side, and a magnetic recording layer formed on the front side, wherein said magnetic layer comprises a ferromagnetic powder dispersed in a binder, and a surface treatment agent comprising a low molecular weight azo dye.

Another aspect of the invention provides a magnetic medium comprising a non-magnetic substrate having a front side and a back side, a back coat formed on the back side, and a magnetic recording layer formed on the front side, wherein the back coat comprises an alpha iron oxide dispersed in a binder, and a low molecular weight azo dye having the following general formula:

—Ar—N=N—Ar— wherein Ar represents an aryl group, each of which independently comprises at least one pendant group selected from an electron donor, and an electron acceptor.

In one preferred embodiment, the surface treatment agent is an acidic form of Chrome Orange.

As used herein, all weights, ratios and amounts are by weight unless otherwise specified.

As used herein, the following terms have these meanings:

1. The term "low molecular weight" means having a molecular weight of less than about 500.
2. The term "coercivity" means the intensity of the magnetic field needed to reduce the magnetization of a ferromagnetic material to zero after it has reached saturation.
3. The term "soft" means having a coercivity of less than 300 Oe, or a Moh's hardness of less than 5.

DETAILED DESCRIPTION OF THE INVENTION

As observed above, the invention provides a surface treatment agent which is useful in single layer or dual layer magnetic recording media. The surface treatment agent is used in a magnetic medium comprising a non-magnetic substrate having a front side and a back side, a back coat formed on the back side, and a magnetic recording layer formed on the front side, wherein the back coat comprises an alpha iron oxide and a binder, and a low molecular weight azo dye having the following general formula:

—Ar—N=N—Ar— wherein Ar represents an aryl group, each of which independently comprises at least one pendant group selected from an electron donor, and an electron acceptor. Electron acceptors include —$NO_2$—COOH, —COONa, —$SO_3H$, and —$SO_3Na$. Electron donors include —OH and —$NH_2$. Useful azo dyes may have both electron acceptors and electron donors pendant from the same aryl group or alternate aryl groups. Desirable groups for use with individual primary pigments will depend on the surface properties of the pigment, and the pH of the pigment used. When the pigment is basic, the surface treatment agent should contain electron acceptor groups, and when the pigment is acidic, the surface treatment agent should contain electron donor groups.

The molecular weights of useful azo dyes are less than 500, preferably less than 350. Commercially available azo dyes which may be used in magnetic recording media of the invention include Chrome Orange, also known as Mordant Orange 1 (80% pure), available from Aldrich Chemical Company, and Alizarin Yellow R, available from Dudley Chemical Corporation, and Azo Violet (4-(4-nitrophenylazo) resorcinol), available from Dudley Chemical Corporation.

In a preferred embodiment, the low molecular weight azo surface treatment agent is Chrome Orange. Chrome Orange is usually commercially available in the form of a sodium salt; however, to improve the solubility in organic solvents and avoid undesirable salt formation in the coating, which can cause surface roughness and debris generation, the Chrome Orange should be used in its acid form, properly known as Chrome Orange Acid. The acid form is precipitated from water by adding hydrochloric acid to the Chrome Orange sodium salt. The sodium chloride formed in the reaction should remain in the water phase.

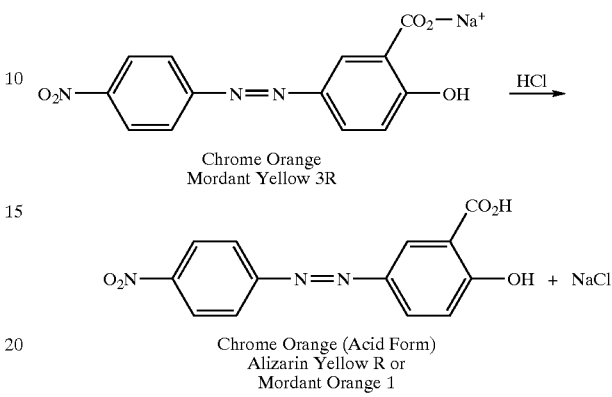

For use in single layer recording media, this surface treatment agent is mixed with a magnetic pigment, preferably a ferromagnetic metal powder, and the treated pigment is then mixed with other materials. Full descriptions of the materials used in magnetic recording layers appear below in the discussion of the upper layer of a dual layer recording medium.

In dual layer magnetic recording media, the layers serve separate functions, but each may require a surface treatment agent.

The Lower Layer

The lower layer of a dual layer magnetic tape is essentially non-magnetic and typically includes a non-magnetic or soft magnetic powder having a coercivity of less than 300 Oe and a resin binder system. By forming the lower layer to be essentially non-magnetic, the electromagnetic characteristics of the upper magnetic layer are not adversely affected. However, to the extent that it does not create any adverse affect, the lower layer may contain a small amount of a magnetic powder.

The pigment or powder incorporated in the lower layer includes at least a primary pigment material and conductive carbon black. The primary pigment material consists of a particulate material, or "particle" selected from non-magnetic particles such as iron oxides, titanium dioxide, titanium monoxide, alumina, tin oxide, titanium carbide, silicon carbide, silicon dioxide, silicon nitride, boron nitride, etc., and soft magnetic particles having a coercivity of less than 300 Oe. Optionally these primary pigment materials can be provided in a form coated with carbon, tin, or other electroconductive material and employed as lower layer pigments. In a preferred embodiment, the primary lower layer pigment material is a carbon-coated hematite material (α-iron oxide), which can be acidic or basic in nature. Preferred alpha-iron oxides are substantially uniform in particle size, or a metal-use starting material that is dehydrated by heating, and annealed to reduce the number of pores. After annealing, the pigment is ready for surface treatment, which is typically performed prior to mixing with other layer materials such as carbon black and the like. Alpha-iron oxides are well known and are commercially available from Dowa Mining Company, Titan Kogyo K, Sakai Chemical Industry Co, and others. The primary pigment preferably has an average particle size of less than about 0.25 μm, more preferably less than about 0.15 μm.

Conductive carbon black material provides a certain level of conductivity so as to prohibit the front coating from charging with static electricity and further improves smoothness of the surface of the upper magnetic layer formed thereon. The conductive carbon black material is preferably of a conventional type and is widely commercially available. In one preferred embodiment, the conductive carbon black material has an average particle size of less than about 20 nm, more preferably about 15 nm. In the case where the primary pigment material is provided in a form coated with carbon, tin or other electroconductive material, the conductive carbon black is added in amounts of from about 1 to about 5 parts by weight, more preferably from about 1.5 to about 3.5 parts by weight, based on 100 parts by weight of the primary lower layer pigment material. In the case where the primary pigment material is provided without a coating of electroconductive material, the conductive carbon black is added in amounts of from about 5 to about 18 parts by weight, more preferably from about 8 to about 12 parts by weight, based on 100 parts by weight of the primary lower layer pigment material. The total amount of conductive carbon black and electroconductive coating material in the lower layer is preferably sufficient to provide a resistivity at or below about $1 \times 10^8$ ohm/cm².

The lower layer can also include additional pigment components such as an abrasive or head cleaning agent (HCA). One preferred HCA component is aluminum oxide. Other abrasive grains such as silica, $ZrO_2$, $Cr_2O_3$, etc., can be employed.

Pursuant to the present invention, however, a significant improvement in the rheology and smoothness of the dispersion of the material in the lower layer is achieved while maintaining low resistance by using certain low molecular weight azo dyes as surface treatment agents.

The azo dyes useful in magnetic recording media layers are low molecular weight azo dyes having a basic formula of

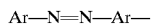

where Ar represents an aryl group, each of which independently comprises at least one pendant group selected from an electron donor, and an electron acceptor. Electron acceptors include $—NO_2$—COOH, —COONa, $—SO_3H$, and $—SO_3Na$. Electron donors include —OH and $—NH_2$. Useful azo dyes may have both electron acceptors and electron donors pendant from the same aryl group or alternate aryl groups. Desirable groups for use with individual primary pigments will depend on the surface properties of the pigment, and the pH of the pigment used. When the pigment is basic, the surface treatment agent should contain electron acceptor groups, and when the pigment is acidic, the surface treatment agent should contain electron donor groups.

The molecular weights of useful azo dyes are less than about 500, preferably less than about 350. Commercially available azo dyes which may be used in magnetic recording media of the invention include Chrome Orange, also known as Mordant Orange 1 (80% pure), available from Aldrich Chemical Company, and Alizarin Yellow R, available from Dudley Chemical Corporation, and Azo Violet (4-(4-nitrophenylazo) resorcinol), available from Dudley Chemical Corporation.

In a preferred embodiment, the surface treatment agent is Chrome Orange. As noted above, Chrome Orange is usually available in the form of a sodium salt; however, to improve the solubility in organic solvents and avoid undesirable salt formation in the coating, the Chrome Orange should be used in its acid form, properly known as Chrome Orange Acid.

The acid form is precipitated from water by adding hydrochloric acid to the Chrome Orange sodium salt. The sodium chloride formed in the reaction should remain in the water phase.

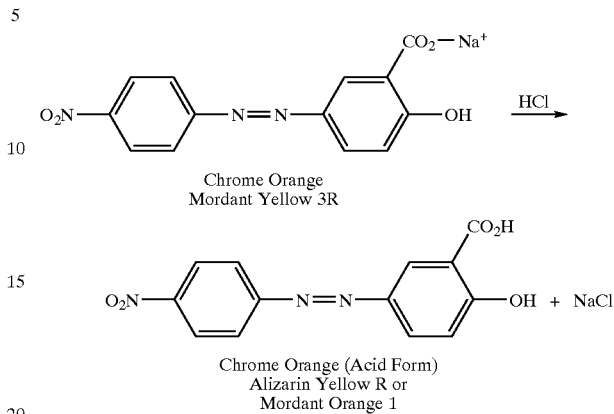

Once the surface treatment agent is ready for use, it is mixed with a solvent and the primary pigment, again preferably an α-iron oxide pigment, and a solvent, and is ready for mixing with the other materials, such as the binder system.

The binder system or resin associated with the lower layer preferably incorporates at least one binder resin, such as a thermoplastic resin, in conjunction with other resin components such as binders and surfactants used to disperse the HCA, a surfactant (or wetting agent), and one or more hardeners. In one preferred embodiment, the binder system of the lower layer includes a combination of a primary polyurethane resin and a vinyl chloride resin. Examples of polyurethanes include polyester-polyurethane, polyether-polyurethane, polycarbonate-polyurethane, polyester-polycarbonate-polyurethane, and polycaprolactone-polyurethane. Other acceptable vinyl chloride resins such as vinyl chloride-vinyl acetate copolymer, vinyl chloride-vinyl acetate-vinyl alcohol copolymer, and vinyl chloride-vinyl acetate-maleic anhydride can also be employed with the primary polyurethane binder. Resins such as bisphenol A epoxide, styrene-acrylonitrile, and nitrocellulose may also be acceptable.

In a preferred embodiment, a primary polyurethane binder is incorporated into the lower layer in amounts of from about 4 to about 10 parts by weight, and preferably from about 6 to about 8 parts by weight, based on 100 parts by weight of the primary lower layer pigment. In a preferred embodiment, the vinyl chloride binder is incorporated into the lower layer in amounts of from about 7 to about 15 parts by weight, and preferably from about 10 to about 12 parts by weight, based on 100 parts by weight of the primary lower layer pigment.

The binder system further preferably includes an HCA binder used to disperse the selected HCA material, such as a polyurethane paste binder (in conjunction with a pre-dispersed or paste HCA). Alternatively, other HCA binders compatible with the selected HCA format (e.g., powder HCA) are acceptable.

The binder system may also contain a conventional surface treatment agent. Known surface treatment agents, such as phenylphosphonic acid (PPA), 4-nitrobenzoic acid, and various other adducts of sulfuric, sulfonic, phosphoric, phosphonic, and carboxylic acids are acceptable.

The binder system may also contain a hardening agent such as isocyanate or polyisocyanate. In a preferred embodiment, the hardener component is incorporated into the lower layer in amounts of from about 2 to about 5 parts by weight, and preferably from about 3 to about 4 parts by weight, based on 100 parts by weight of the primary lower layer pigment.

The lower layer may further contain one or more lubricants such as a fatty acid and/or a fatty acid ester. The incorporated lubricant(s) exist throughout the front coating and, importantly, at the surface of the upper layer. The lubricant(s) reduces friction to maintain smooth contact with low drag, and protects the media surface from wear. Thus, the lubricant(s) provided in both the upper and lower layers are preferably selected and formulated in combination. By way of background, conventional magnetic recording tape formulations employ technical grade fatty acids and fatty acid esters as the lubricant(s). It has surprisingly been found that these technical grade lubricant materials contribute to formation of sticky debris in the front coating due to migration of impurities to the front coating surface. This debris, in turn, can lead to poor tape performance due to contamination of recording heads and other media transport surfaces, interference with lubricity of the medium in transport causing excessive frictional drag, and media wear.

In a preferred embodiment, the lower layer includes stearic acid that is at least 90 percent pure as the fatty acid. Although technical grade acids and/or acid esters can also be employed for the lubricant component, incorporation of high purity lubricant materials ensures robust performance of the resultant medium. Alternatively, other acceptable fatty acids include myristic acid, palmitic acid, oleic acid, etc., and their mixtures. The lower layer formulation can further include a fatty acid ester such as butyl stearate, isopropyl stearate, butyl oleate, butyl palmitate, butylmyristate, hexadecyl stearate, and oleyl oleate. The fatty acids and fatty acid esters may be employed singly or in combination. In a preferred embodiment, the lubricant is incorporated into the lower layer in an amount of from about 1 to about 10 parts by weight, and preferably from about 1 to about 5 parts by weight, based on 100 parts by weight parts of the electroconductive-coated primary lower layer pigment.

The materials for the lower layer are mixed with the surface treated primary pigment and the lower layer is coated to the substrate. Useful solvents associated with the lower layer coating material preferably include cyclohexanone (CHO), with a preferred concentration of from about 5% to about 50%, methyl ethyl ketone (MEK) preferably having a concentration of from about 30% to about 90%, and toluene (Tol), of concentrations from about 0% to about 40%. Alternatively, other ratios can be employed, or even other solvents or solvent combinations including, for example, xylene, tetrahydrofuran, and methyl amyl ketone, are acceptable.

Upper Layer

The upper layer of a dual layer magnetic tape generally consists of a magnetic particle pigment or powder dispersed in an appropriate binder or resin system, and can further contain other components such as lubricants, hardeners, etc.

The magnetic particle pigment preferably consists of a primary magnetic particle pigment in conjunction with a non-magnetic large, soft particle powder (i.e., having a Moh's hardness of less than 5 and average particle size of from about 50 to about 500 nm, for example, large particle carbon black), along with other additives such as abrasives (HCA). The primary magnetic particle pigment is preferably a ferromagnetic powder including, for example, magnetic iron oxide ($\gamma$-$FeO_x$) and Co-containing (modified or coated) $\gamma$-$FeO_x$(x=1.33–1.50), ferromagnetic metal powder ($\alpha$-Fe, alloys of iron with Co or Ni), etc. In order to improve the required characteristics, the preferred ferromagnetic metal powder contains various additives, such as semi-metal or non-metal elements and their salts or oxides such as Al, Co, Y, Ca, Mg, Mn, Si, etc. The selected ferromagnetic powder may be treated with various auxiliary agents before it is dispersed in the binder system, resulting in the primary magnetic particle pigment.

In addition to the preferred primary magnetic metal particle pigment described above, the metal particle pigment of the upper layer further includes a large particle carbon material of a size that ensures a small kinetic friction coefficient, good running endurance, and surface smoothness. More preferably, the upper layer pigment includes a large particle carbon material that includes spherical carbon particles. The large particle carbon materials have a particle size on the order of from about 50 to about 500 nm, more preferably from about 100 to about 350 nm. Spherical large carbon particle materials are known and readily commercially available from a variety of sources, including Cabot Corporation, Mitsubishi Chemical Corporation, and Columbia Carbon Company, Ltd., among others.

An additional additive associated with the upper layer pigment is an abrasive or head cleaning agent (HCA) component, preferably aluminum oxide and is similar to that described above with respect to the lower layer.

The binder system associated with the upper layer may be similar to the binder resin previously described with respect to the lower layer including the HCA binder, the surface treatment agent and the isocyanate hardener. In one preferred embodiment, the binder system of the upper layer includes a primary polyurethane binder and a vinyl chloride binder. The primary polyurethane binder is contained in an amount of from about 3 to about 20 parts by weight, preferably from about 4 to about 12 parts by weight, based on 100 parts by weight of the primary magnetic metal particle powder. Further, the preferred vinyl chloride binder is contained in an amount of from about 5 to about 20 parts by weight, preferably from about 8 to about 15 parts by weight, based upon 100 parts by weight of the primary magnetic metal particle powder. Where the binder system further includes an HCA binder, a surfactant, and isocyanate hardener, a preferred weight ratio of the resin to the primary metal particle powder is preferably from about 1:4 to about 1:6.

The upper layer preferably further includes a lubricant such as a fatty acid and/or fatty acid ester. With reference to the discussion above relating to lower layer lubricants, the fatty acid lubricant component of the upper layer is preferably of a high purity (at least 90 percent pure). In one preferred embodiment, the lubricant employed with the upper layer includes at least about 90 percent pure stearic acid as the fatty acid. As previously described with respect to the lubricants associated with the lower layer, the at least about 90 percent pure fatty acid lubricant component is preferred in the upper layer formulation to ensure uncompromised lubrication and the absence of recording head contamination.

In a preferred embodiment, the high purity stearic acid is present in an amount from about 0.2 to about 5.0 parts by weight, based upon 100 parts by weight of the primary magnetic metal particle powder; and a fatty acid ester component is preferably present in an amount from about 0.5 to about 2 parts by weight, more preferably from about 0.5 to about 1.5 parts by weight, per 100 parts by weight of the primary magnetic metal particle powder. As previously described, however, other lubricant components and/or amounts are also acceptable.

As with the lower layer, the upper layer is preferably formulated as a coating material using a solvent, with this coating material being coated onto the lower layer. With this in mind, in one preferred embodiment, a solvent consisting of from about 5% to about 50% CHO, from about 30% to about 90% MEK, and from about 0% to about 40% Tol, more preferably, from about 5% to about 40% CHO, from about 40% to about 60% MEK, and from about 5% to about 30% Tol, with it being understood that a wide variety of other solvents or combination solvents are also available.

Back Coat

The back coat is generally of a type conventionally employed, and thus primarily consists of a soft (i.e., Moh's hardness <5) non-magnetic particle material such as carbon black or silicone dioxide particles. In one embodiment, the back coat layer comprises a combination of two kinds of carbon blacks, including a primary, small carbon black component and a secondary, large texture carbon black component, in combination with appropriate binder resins. The primary, small carbon black component preferably has an average particle size on the order of from about 10 to about 25 nm, whereas the secondary, large carbon component preferably has an average particle size on the order of from about 50 to about 300 nm. In another embodiment, the back coat layer comprises an alpha iron oxide and a binder, and a low molecular weight azo dye having the following general formula:

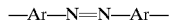

wherein Ar represents an aryl group, each of which independently comprises at least one pendant group selected from an electron donor, and an electron acceptor. Details for the preferred low molecular weight azo compounds are described in the single and dual layer front side coating sections.

As is known in the art, back coat pigments dispersed as inks with appropriate binders, surfactant, ancillary particles, and solvents are typically purchased from a designated supplier. In a preferred embodiment, the back coat binder includes at least one of a polyurethane, phenoxy resin, and nitrocellulose added in an amount appropriate to modify coating stiffness as desired.

Substrate

The substrate can be any conventional non-magnetic substrate useful as a magnetic recording medium support. Exemplary substrate materials useful for magnetic recording tapes include polyesters such as polyethylene terephthalate, polyethylene naphthalate, a mixture of polyethylene terephthalate and polyethylene naphthalate; polyolefins (e.g., polypropylene); cellulose derivatives; polyamides; and polyimides. Preferably, polyethylene terephthalate (PET) or polyethylene naphthalate (PEN) is employed.

The description herein should not be construed as limiting as variations may be readily conceived by one skilled in the art. The scope of the invention is that of the claims.

EXAMPLES

Example 1

Samples of dispersions of alpha-iron oxide particles containing surface treatment agents were prepared in half-pint metal cans containing 200 parts-by-weight of milling media, 1 mm diameter ceramic beads from SEPR, Cedex, France, according to the following procedure of sequential charges of ingredients. Units are in parts-by-weight (pbw):

| Charge A. | |
|---|---|
| alpha-iron oxide (particle size = 0.11 µm, surface area = 65 m²/gm and pH = 9) | 200 pbw |
| Surface treatment agent | See Table 2 |
| Solvent (Methyl ethyl ketone, methyl isobutyl ketone, tetrahydrofuran, 20:45:35 weight %) | *See below |

*For each sample solvent was added to make a 65% by weight solids mixture. Charge A was shaken for 1 hour in a paint shaker.

| Charge B. | |
|---|---|
| Resin A, 44 wt. % in methyl ethyl ketone (vinyl copolymer described in Example 5 of U.S. Pat. No. 6,099,895) | 8.56 pbw |
| Solvent (Methyl ethyl ketone, methyl isobutyl ketone, tetrahydrofuran, 20:45:35 weight %) | *See below |

*For each sample solvent was added to make a 45% by weight solids mixture. Charge B was shaken for 2 hours in a paint shaker.

| Charge C. | |
|---|---|
| Polyurethane, 30 wt. % in methyl ethyl ketone/toluene, 1:1 (UR7300, Toyobo, Japan) | 12.55 pbw |
| Solvent (Methyl ethyl ketone, methyl isobutyl ketone, tetrahydrofuran, 20:45:35 weight %) | *See below |

*For each sample solvent was added to make a 43% by weight solids mixture. Charge C was shaken for 3 hours in a paint shaker.

After Charge C, the mixtures were separated from the milling media by filtering through a filter (paint strainer) with a peristaltic pump. Before testing all samples were activated by adding 2.24 pbw Mondur CB55-N, a polyisocyanate crosslinker from Bayer Corp., Pittsburgh, Pa. as a 55 wt. % solution in methyl ethyl ketone. Lubricants, stearic acid and butyl stearate, 0.4 pbw of each, were also added at this stage. Thus, composition of solid components in the final mixture is given in Table 1.

TABLE 1

| | Solids wt. % |
|---|---|
| Alpha-iron oxide | 79.43 |
| Surface treatment agent (at 2%) | 1.59 |
| Resin A | 7.47 |
| Polyurethane UR7300 | 7.47 |
| Polyisocyanate CB-55N | 2.44 |
| Stearic acid | 0.79 |
| Butyl stearate | 0.79 |

Prior to testing samples were thinned down to 37 wt. % solids with the same solvent blend. Viscosity, $\eta$, was measured vs. shear rate, $\gamma$, on a Bohlin VOR rheometer and limiting high- and low-shear viscosities were extracted from these curves by fitting them with the following equation $$\frac{1}{\eta} = \frac{1}{\eta_0} + \frac{1}{\eta_{thin}(\dot{\gamma})}, \text{ where } \eta_{thin}(\dot{\gamma}) \equiv \left[X^{\frac{1}{3}} + (\sigma_y/\dot{\gamma})^{\frac{1}{3}}\right]^3, \quad (1)$$

$$X \equiv \eta_0 \eta_{HS} / (\eta_0 - \eta_{HS}),$$

and three fitting parameters, high-shear viscosity, $\eta_{HS}$, low-shear viscosity, $\eta_0$, and yield stress, $\sigma_y$, were calculated. The former two are listed in Table 2 below and may be used to characterize shear-thinning behavior of the mixture. Stronger shear thinning, i.e., higher $\eta_0/\eta_{HS}$ ratio, may be necessary for some coating applications. The samples were knife coated onto a polyester substrate. The coating was dried for 24 hr. at room temperature after which gloss values were measured as listed in Table 2.

TABLE 2

| | 45 deg. gloss | High-shear viscosity (Pa * s) | Low-shear viscosity (Pa * s) |
|---|---|---|---|
| No surface treatment agent | 90 | 24 | 232 |
| 1% Phenylphosphonic acid | 105 | 24 | 349 |
| 2% Phenylphosphonic acid | 106 | 25 | 334 |
| 1% 4-Nitrobenzoic acid | 112 | 18 | 419 |
| 2% 4-Nitrobenzoic acid | 130 | 11 | 577 |
| 1% Chrome orange acid | 118 | 22 | 334 |
| 2% Chrome orange acid | 127 | 18 | 577 |

Example 2

Samples were prepared as in Example 1, but with the following changes. In Charge B, 4.07 pbw of the Resin A solution was added. Also, 2.4 pbw of BP2000 carbon black (available from Cabot) was added. In Charge C, 13.57 pbw of polyurethane L7525 solution was added. This solution is also available from Toyobo at 30 wt. % in methyl ethyl ketone and toluene, 1:1. The rest of the milling was performed as in Example 1. Composition of solid components in the final mixture is given in Table 3.

TABLE 3

| Component | Solids wt. % |
|---|---|
| Alpha-iron oxide | 74.80 |
| BP2000 | 4.49 |
| Surface treatment agent (at 2%) | 1.50 |
| Resin A | 7.62 |
| Polyurethane L7525 | 7.61 |
| Polyisocyanate CB-55N | 2.49 |
| Stearic Acid | 0.75 |
| Butyl Stearate | 0.75 |

Samples were then coated and tested as described in the Example 1 at 30 wt. % solids. The following gloss and viscosity values were determined in Table 4.

TABLE 4

| | 45 deg. gloss | High-shear viscosity (Pa * s) | Low-shear viscosity (Pa * s) |
|---|---|---|---|
| No surface treatment agent | 60 | 43 | 59 |
| 1% Phenylphosphonic acid | 68 | N/a | N/a |
| 2% Phenylphosphonic acid | 73 | N/a | N/a |
| 2% 4-Nitrobenzoic acid | 80 | 11 | 140 |
| 1% Chrome orange acid | 74 | 25 | 305 |

TABLE 4-continued

| | 45 deg. gloss | High-shear viscosity (Pa * s) | Low-shear viscosity (Pa * s) |
|---|---|---|---|
| 2% Chrome orange acid | 80 | 15 | 140 |
| 3% Chrome orange acid | 75 | 13 | 102 |

N/a indicates that these samples were poorly fitted with the equation (1).

Example 3

Samples were prepared, coated and tested exactly as in Example 2, only a different polyurethane, 13.57 pbw UR4122, also available from Toyobo as a 30 wt. % in methyl ethyl ketone and toluene, 1:1, was added in Charge C. The measured gloss values are given in Table 5.

TABLE 5

| | 45 deg. Gloss |
|---|---|
| No surface treatment agent | 36 |
| 1% 4-nitrobenzoic acid | 53 |
| 2% 4-nitrobenzoic acid | 76 |
| 1% Chrome orange acid | 69 |
| 2% Chrome orange acid | 79 |

Example 4

Samples of dispersions of alpha-iron oxide particles containing surface treatment agents were prepared as in Example 1 except a different alpha-iron oxide particle and polyurethane were used.

| Charge A. | |
|---|---|
| alpha-Iron oxide | 200 pbw |
| (particle size = 0.15 μm, surface area = 25 m²/gm and pH = 5) | |
| Surface treatment agent | See Table 7 |
| Solvent | *See below |
| (Methyl ethyl ketone, methyl isobutyl ketone, tetrahydrofuran, 20:45:35 weight %) | |

*For each sample solvent was added to make a 65% by weight solids mixture. Charge A was shaken for 1 hour in a paint shaker.

| Charge B. | |
|---|---|
| Resin A, 44 wt. % in methyl ethyl ketone | 10.89 pbw |
| (vinyl copolymer described in Example 5 of U.S. Pat. No. 6,099,895) | |
| Polyurethane, 42 wt. % in methyl ethyl ketone | 5.58 pbw |
| (Carboxylated polyurethane described in Example 6 of U.S. Pat. No. 5,759,666) | |
| Solvent | *See below |
| (Methyl ethyl ketone, methyl isobutyl ketone, tetrahydrofuran, 20:45:35 weight %) | |

*For each sample solvent was added to make a 40% by weight solids mixture. Charge B was shaken for 5 hours in a paint shaker.

After Charge B, the mixture was separated from the milling media by filtering it through a filter (paint strainer) with a peristaltic pump. Before testing all samples were activated by adding 4.08 pbw of a 42 wt. % solution in methyl ethyl ketone of polyisocyanate crosslinker (as described in Example 13 of U.S. Pat. No. 5,759,666). Thus, composition of solid components in the final mixture is given in Table 6.

TABLE 6

|  | Solids wt. % |
| --- | --- |
| Alpha-iron oxide | 76.93 |
| BP2000 | 4.62 |
| Surface treatment agent (2%) | 1.54 |
| Resin A | 9.22 |
| Carboxylated polyurethane | 4.40 |
| Polyisocyanate | 3.30 |

Samples were knife-coated after dilution to 30 wt. % solids with the solvent blend and the following gloss values were measured:

TABLE 7

|  | 45 deg. gloss |
| --- | --- |
| No surface treatment agent | 50 |
| 2% Phenylphosphonic acid | 53 |
| 2% 4-Nitrobenzoic acid | 52 |
| 2% Chrome orange acid | 64 |
| 2% Azo violet | 72 |

Example 5

Using different concentrations of Chrome Orange acid surface treatment agent, magnetic recording media containing ferromagnetic metal powder were prepared in half-pint metal cans containing 100 g of milling media, 1.0 mm ceramic beads (SEPR, Cedex, France), in a four step process using the following formulation:

Charge A.

| | |
| --- | --- |
| Ferromagnetic metal powder (major axis length = 75 nm, surface area = 57 m²/g, coercivity = 2495 Oe, pH = 9, atom % composition = 49.6% Fe, 12% Co, 2.7% Al, 8.2% Y) | 100 pbw |
| Surface treatment agent (Chrome Orange acid) | See Table 9 |
| Solvent (Methyl ethyl ketone, cyclohexanone, toluene, 50:20:30 weight %) | *See below |

*For each sample solvent was added to make a 65% by weight solids mixture. Charge A was shaken for 1 hour in a paint shaker.

Charge B.

| | |
| --- | --- |
| Polyurethane resin no. 1, 15 wt. % in methyl ethyl ketone (Irocoat CA-151HT, Huntsman Polyurethanes, Opelika, AL) | 4.9 pbw |
| Alumina particles (HIT-60A, Sumitomo Chemical Co. LTD, Tokyo, Japan) | 8 pbw |
| Carbon particle no. 1 (Raven 410, Columbian Chemical Co., Marietta, GA) | 0.5 pbw |
| Carbon particle no. 2 (Sevacarb MT-LS Thermal Black N-991, Columbian Chemical Co., Marietta, GA) | 0.5 pbw |
| Solvent (Methyl ethyl ketone, cyclohexanone, toluene, 50:20:30 weight %) | *See below |

Charge B.

*For each sample solvent was added to make a 35% by weight solids mixture. Charge B was shaken for 9 hours in a paint shaker.

Charge C.

| | |
| --- | --- |
| Polyurethane resin no. 2, 15 wt. % in methyl ethyl ketone (Irocoat CA-47, Huntsman Polyurethanes, Opelika, AL) | 9.9 pbw |
| Solvent (Methyl ethyl ketone, cyclohexanone, toluene, 50:20:30 weight %) | *See below |

*For each sample solvent was added to make a 28.875% by weight solids mixture. Charge C was shaken for 2 hours in a paint shaker.

Charge D.

| | |
| --- | --- |
| Lubricant no. 1 (Stearic acid, Aldrich Chemical Co., Milwaukee, WI) | 1.5 pbw |
| Lubricant no. 2 (Butyl stearate, Aldrich Chemical Co., Milwaukee, WI) | 1.0 pbw |
| Polyisocyanate (Mondur CB55N, 55% by weight solids in MEK, Bayer Corp., Pittsburgh, PA) | 2.8 pbw |
| Solvent (Methyl ethyl ketone, cyclohexanone, toluene, 50:20:30 weight %) | *See below |

*For each sample solvent was added to make a 25% by weight solids mixture. Charge D was shaken for 30 minutes in a paint shaker.

The composition of solid components in the final mixture is given in Table 8.

TABLE 8

|  | Solids wt. % |
| --- | --- |
| Ferromagnetic metal powder | 74.57 |
| Chrome orange acid* | 3.73 |
| Alumina | 5.97 |
| Carbon black no. 1 | 0.37 |
| Carbon black no. 2 | 0.37 |
| Polyurethane no. 1 | 3.65 |
| Polyurethane no. 2 | 7.38 |
| Stearic acid | 1.12 |
| Butyl stearate | 0.75 |
| Polyisocyanate | 2.09 |

*Based on 5 pbw based on 100 pbw metal powder

Handspreads for each dispersion were pulled at 25% by weight final solids onto 20 micron thick polyester substrate using a knife coater set at a wet coating thickness of 33 microns. Handspreads were pulled first and then dried in a 6000 Oe electromagnetic field to orient the magnetic pigments. The properties of the resultant handspreads are shown in Table 9.

TABLE 9

| Chrome Orange Parts by weight | Coercivity (Oe) | Squareness ($\Phi r/\Phi m$) | SFD | Migration in 6000 Oe field | 45° Gloss |
| --- | --- | --- | --- | --- | --- |
| 0 | 2560 | 0.715 | 0.690 | Yes | 45 |
| 3 | 2528 | 0.908 | 0.370 | Yes | 84 |
| 4 | 2604 | 0.934 | 0.319 | No | 134 |

TABLE 9-continued

| Chrome Orange Parts by weight | Coercivity (Oe) | Squareness (Φr/Φm) | SFD | Migration in 6000 Oe field | 45° Gloss |
|---|---|---|---|---|---|
| 5 | 2608 | 0.945 | 0.298 | No | 130 |
| 6 | 2649 | 0.938 | 0.298 | No | 126 |

Squareness is defined as the ratio of the remnance magnetization to the maximum magnetization. SFD is the switching field distribution. The data in Table 1 show that the acid form of Chrome Orange acts as a good surface modifier for metal particle magnetic pigments, leading to better dispersion quality. As the loading was increased from 0 to 4 parts by weight, squareness, SFD, and 45° gloss all improved. In addition migration of the coating in the 6000 Oe field disappeared at the higher loadings.

What is claimed is:

1. A dual layer magnetic recording medium comprising a non-magnetic substrate having a front side and a back side, a back coat formed on the back side, a lower support layer formed over the front side, and a magnetic recording upper layer formed over said lower layer, said magnetic recording upper layer comprising a magnetic metal particle powder dispersed in a binder; wherein said lower layer comprises a granular alpha iron oxide compound dispersed in a binder, and as a surface treatment agent, at least one low molecular weight azo dye having the following general formula:

—Ar—N=N—Ar—

wherein Ar represents an aryl group, each of which independently comprises at least one pendant group selected from an electron donor, and an electron acceptor, wherein at least one of said pendant groups is an electron acceptor selected from the group consisting of —COOH, —NO$_2$ wherein said electron donor is selected from the group consisting of —OH and —NH$_2$ and wherein said surface treatment agent is acidic chrome orange.

2. A dual layer magnetic recording medium according to claim 1, wherein said lower layer further includes a fatty acid ester lubricant, a fatty acid lubricant and a conductive carbon black material dispersed in said binder.

3. A dual layer magnetic recording medium according to claim 2, wherein said conductive carbon black comprises less than about 5 weight percent of said lower layer.

4. A dual layer magnetic recording medium according to claim 1, wherein the upper layer further comprises a large carbon particle material having a particle size of from about 50 to about 500 nm.

5. A dual layer magnetic recording medium according to claim 1, wherein the back coat includes a carbon black pigment, a binder, and at least one compound selected from phenoxy resin and nitrocellulose.

6. A dual layer magnetic recording medium according to claim 1, wherein the upper layer comprises a ferromagnetic pigment, aluminum oxide, a spherical large particle carbon material having a particle size of from about 50 to about 500 nm, a polyurethane binder, a vinyl chloride binder, a hardener, a fatty acid ester lubricant, and a fatty acid lubricant.

7. A single layer magnetic recording medium comprising a non-magnetic substrate having a front side and a back side, a back coat formed on the back side, and a magnetic recording layer formed on the front side, wherein said magnetic layer comprises a ferromagnetic powder dispersed in a binder, and a surface treatment agent comprising a low molecular weight azo dye having the following general formula:

—Ar—N=N—Ar—

wherein Ar represents an aryl group, each of which independently comprises at least one pendant group selected from an electron donor, and an electron acceptor, wherein at least one of said pendant groups is an electron acceptor selected from the group consisting of —COOH, —NO$_2$ wherein said electron donor is selected from the group consisting of —OH and —NH$_2$, and wherein said surface treatment agent is acidic chrome orange.

8. A single layer magnetic recording medium according to claim 7, wherein said magnetic layer comprises a ferromagnetic metal powder, aluminum oxide, carbon black, and a binder therefore.

9. A single layer magnetic recording medium according to claim 8 comprising a ferromagnetic pigment, aluminum oxide, a spherical large particle carbon material having a particle size of from about 50 to about 500 nm, a polyurethane binder, a vinyl chloride binder, an isocyanate hardener, a fatty acid ester lubricant, and a fatty acid lubricant.

10. A magnetic recording medium according to claim 7, wherein the backcoat further comprises carbon black, and a metal oxide selected from titanium dioxide, aluminum oxide and a mixture thereof.

* * * * *